(12) United States Patent
Morley et al.

(10) Patent No.: US 11,210,200 B2
(45) Date of Patent: *Dec. 28, 2021

(54) SOFTWARE VALIDATION FOR AUTONOMOUS VEHICLES

(71) Applicant: Waymo LLC, Mountain View, CA (US)

(72) Inventors: Franklin Morley, East Palo Alto, CA (US); Omer Baror, Mountain View, CA (US); Nathaniel Fairfield, Mountain View, CA (US); Miner Crary, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,663

(22) Filed: Sep. 23, 2020

(65) Prior Publication Data

US 2021/0004313 A1 Jan. 7, 2021

Related U.S. Application Data

(63) Continuation of application No. 15/864,239, filed on Jan. 8, 2018, now Pat. No. 10,831,636.

(51) Int. Cl.
*G06F 11/36* (2006.01)
*G05D 1/00* (2006.01)

(52) U.S. Cl.
CPC ...... *G06F 11/3608* (2013.01); *G06F 11/3688* (2013.01); *G05D 1/0088* (2013.01)

(58) Field of Classification Search
CPC  G06F 11/3608; G06F 11/3688; G05D 1/0088
See application file for complete search history.

(56) References Cited

U.S. PATENT DOCUMENTS 8,126,642 B2   2/2012  Trepagnier et al.
9,308,919 B2   4/2016  Schmdderich
(Continued)

FOREIGN PATENT DOCUMENTS

AU   2018267541 A1   6/2019
CN      105911986 A   8/2016
(Continued)

OTHER PUBLICATIONS

"International Search Report and Written Opinion for Application No. PCT/US2019/012713 dated May 1, 2019", 7 pages.
(Continued)

*Primary Examiner* — Douglas M Slachta
(74) *Attorney, Agent, or Firm* — Botos Churchill IP Law

(57) ABSTRACT

Aspects of the disclosure relate to validating autonomous control software for operating a vehicle autonomously. For instance, the autonomous control software is run through a driving scenario to observe an outcome for the autonomous control software. A validation model is run through the driving scenario a plurality of times to observe an outcome for the model for each of the plurality of times. Whether the software passed the driving scenario is determined based on whether the outcome for the software indicates that a virtual vehicle under control of the software collided with another object during the single time. Whether the validation model passed the driving scenario is determined based on whether the outcome for the model indicates that a virtual vehicle under control of the model collided with another object in any one of the plurality of times. The software is validated based on the determinations.

20 Claims, 8 Drawing Sheets

(56) References Cited

U.S. PATENT DOCUMENTS

| | | | |
|---|---|---|---|
| 9,406,177 | B2 | 8/2016 | Attard et al. |
| 9,581,461 | B1 | 2/2017 | Chintakindi et al. |
| 9,587,952 | B1 | 3/2017 | Slusar |
| 9,751,506 | B2 | 9/2017 | Mudalige et al. |
| 9,754,325 | B1* | 9/2017 | Konrardy ............... H04L 67/12 |
| 9,858,621 | B1 | 1/2018 | Konrardy et al. |
| 10,303,178 | B1 | 5/2019 | Gutmann |
| 10,431,023 | B1* | 10/2019 | Watson ............... G01M 17/007 |
| 10,885,240 | B2* | 1/2021 | Tascione ............. G05D 1/0212 |
| 2006/0200333 | A1 | 9/2006 | Dalal et al. |
| 2007/0265721 | A1 | 11/2007 | Coburn et al. |
| 2008/0091352 | A1* | 4/2008 | O'Hare ................ G08G 1/163 |
| | | | 701/301 |
| 2009/0327011 | A1 | 12/2009 | Petroff |
| 2010/0094520 | A1 | 4/2010 | Zagorski |
| 2010/0191071 | A1 | 7/2010 | Anderson et al. |
| 2012/0277940 | A1 | 11/2012 | Kumar et al. |
| 2014/0040872 | A1 | 2/2014 | Goetz et al. |
| 2015/0154327 | A1 | 6/2015 | Shuster et al. |
| 2015/0242953 | A1 | 8/2015 | Suiter |
| 2015/0339928 | A1 | 11/2015 | Ramanujam |
| 2016/0314224 | A1 | 10/2016 | Wei et al. |
| 2016/0357262 | A1 | 12/2016 | Ansari |
| 2016/0368492 | A1* | 12/2016 | Al-Stouhi ............. G08G 1/162 |
| 2017/0132117 | A1 | 5/2017 | Stefan et al. |
| 2017/0132118 | A1 | 5/2017 | Stefan et al. |
| 2017/0132334 | A1* | 5/2017 | Levinson ............... G06F 30/20 |
| 2017/0169208 | A1* | 6/2017 | Jantz ..................... H04L 9/0861 |
| 2017/0213149 | A1 | 7/2017 | Micks et al. |
| 2017/0285639 | A1 | 10/2017 | Jones et al. |
| 2017/0286570 | A1* | 10/2017 | Kim ....................... G06F 30/20 |
| 2017/0320492 | A1 | 11/2017 | Ferrari et al. |
| 2018/0089563 | A1* | 3/2018 | Redding ............. G05D 1/0088 |
| 2018/0107770 | A1 | 4/2018 | Cahoon et al. |
| 2018/0127000 | A1 | 5/2018 | Jiang et al. |
| 2018/0268092 | A1 | 9/2018 | Luo et al. |
| 2018/0341571 | A1* | 11/2018 | Kislovskiy ............... G06F 8/65 |
| 2018/0341887 | A1 | 11/2018 | Kislovskiy et al. |
| 2019/0163182 | A1* | 5/2019 | Li .......................... G05D 1/0088 |
| 2020/0001888 | A1* | 1/2020 | Pretsch ................... G06F 30/15 |
| 2020/0012239 | A1* | 1/2020 | Yamamoto ............. G06F 11/28 |

FOREIGN PATENT DOCUMENTS

| | | |
|---|---|---|
| JP | 2015049187 A | 3/2015 |
| JP | 2017173309 A | 9/2017 |
| KR | 20090014195 A | 2/2009 |
| KR | 20130091907 A | 8/2013 |
| WO | 2004090659 A2 | 10/2004 |

OTHER PUBLICATIONS

Atorf, et al., "Interactive Analysis and Visualization of Digital Twins in High-Dimensional State Spaces", 2018 15th International Conference on Control, Automation, Robotics and Vision (ICARCV), IEEE, pp. 241-246.

Notification of Material Filed by a Third Party under Section 27/28 for Australian Patent Application No. 2019205817, Australian Government, IP Australia, dated Jul. 22, 2021.

The Extended European Search Report for European Patent Application No. 19735706.4, dated Jul. 30, 2021.

The Search and Examination Report for Singapore Application No. 11202005671R, dated Aug. 2, 2021.

Notification of Further Material Filed by a Third Party under Section 27 for Australian Patent Application No. 2019205817, Australian Government, IP Australia, dated Aug. 17, 2021.

The Notice of Allowance for Korean Patent Application No. 10-2020-7019371, dated Oct. 20, 2021.

* cited by examiner

700

SOFTWARE VALIDATION FOR AUTONOMOUS VEHICLES

CROSS REFERENCE TO RELATED APPLICATIONS

The present application is a continuation of U.S. patent application Ser. No. 15/864,239, filed Jan. 8, 2018, the entire disclosure of which is incorporated by reference herein.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by determining and following a route which may require the vehicle to respond to and interact with other road users such as vehicles, pedestrians, bicyclists, etc. It is critical that the autonomous control software used by these vehicles to operate in the autonomous mode is tested and validated before such software is actually used to control the vehicles in areas where the vehicles are interacting with other objects.

BRIEF SUMMARY

One aspect of the disclosure provides a method of validating autonomous control software for operating a vehicle in an autonomous driving mode. The method includes running the autonomous control software through a driving scenario a single time to observe an outcome of the scenario for the autonomous control software; running a validation model through the driving scenario a plurality of times to observe an outcome of the scenario for the validation model for each of the plurality of times; determining whether the autonomous control software passed the driving scenario based on whether the outcome of the scenario for the autonomous control software indicates that a virtual vehicle under control of the autonomous control software collided with another object during the single time; determining whether the validation model passed the driving scenario based on whether outcome of the scenario for the validation model indicates that a virtual vehicle under control of the validation model collided with another object in any one of the plurality of times; and validating the autonomous control software based on the determinations.

In one example, the driving scenario is one of a plurality of driving scenarios for a given category of driving scenarios, and validating the autonomous control software is based on evaluating performance of the autonomous control software and the validation model over all of the plurality of driving scenarios for the given category. In this example, the method also includes comprising comparing a number of the driving scenarios passed by the autonomous control software to a number of scenarios passed at least once in a plurality of times, and validating the autonomous control software is further based on the comparison. In another example, running the validation model through the driving scenario a plurality of times includes running the scenario once for each types of response identified in a predetermined set of general types of responses. In another example, each of the plurality of times corresponds to the response of the validation model being different, such that a first one of the plurality includes a braking response, a second one of the plurality includes a swerving right response, a third one of the plurality includes a swerving left response, a fourth one of the plurality includes a braking and swerving right response, and a fifth one of the plurality includes a braking and swerving left response. In another example, determining whether the autonomous control software passed the driving scenario is further based on a severity level of any collision with the another object. In this example, validating the autonomous control software is further based on the severity level. In another example, determining whether the validation model passed the driving scenario is further based on a severity level of any collision with the another object. In this example, validating the autonomous control software is further based on the severity level. In another example, the method also includes identifying a handover time for giving the autonomous control software or the validation model control of the virtual vehicle in the scenario corresponding to a predetermined number of seconds within the scenario before the virtual vehicle would collide with the another object if both objects continued on respective current trajectories in the scenario, and the handover time is used to run the validation model through the driving scenario and to run the autonomous control software through the driving scenario. In this example, the handover time is used to run the autonomous control software through the driving scenario. In addition or alternatively, the method also includes providing the scenario and the handover time to a human operator for confirmation of the handover time.

A further aspect of the disclosure provides a system for validating autonomous control software for operating a vehicle in an autonomous driving mode. The system includes one or more computing devices having one or more processors configured to run the autonomous control software through a driving scenario a single time to observe an outcome of the scenario for the autonomous control software; run a validation model through the driving scenario a plurality of times to observe an outcome of the scenario for the validation model for each of the plurality of times; determine whether the autonomous control software passed the driving scenario based on whether the outcome of the scenario for the autonomous control software indicates that a virtual vehicle under control of the autonomous control software collided with another object during the single time; determine whether the validation model passed the driving scenario based on whether outcome of the scenario for the validation model indicates that a virtual vehicle under control of the validation model collided with another object in any one of the plurality of times; and validate the autonomous control software based on the determinations.

In one example, the driving scenario is one of a plurality of driving scenarios for a given category of driving scenarios, and validating the autonomous control software is based on evaluating performance of the autonomous control software and the validation model over all of the plurality of driving scenarios for the given category. In this example, the one or more processors are configured to compare a number of the driving scenarios passed by the autonomous control software to a number of scenarios passed at least once in a plurality of times, and validating the autonomous control software is further based on the comparison. In another example, the one or more processors are further configured to determine whether the autonomous control software passed the driving scenario further based on a severity level of any collision with the another object. In another example, the one or more processors are further configured to determine the validation model passed the driving scenario further based on a severity level of any collision with the another object. In another example, the one or more processors are further configured to identify a handover time for giving the autonomous control software or the validation model control of the virtual vehicle in the scenario corresponding to a predetermined number of seconds within the scenario before the virtual vehicle would collide with the another object if both objects continued on respective current trajectories in the scenario, and the handover time is used to run the validation model through the driving scenario and to run the autonomous control software through the driving scenario. In another example, the system also includes the autonomous control software. In another example, the system also includes the validation model.

DETAILED DESCRIPTION

Overview

Figure 1:
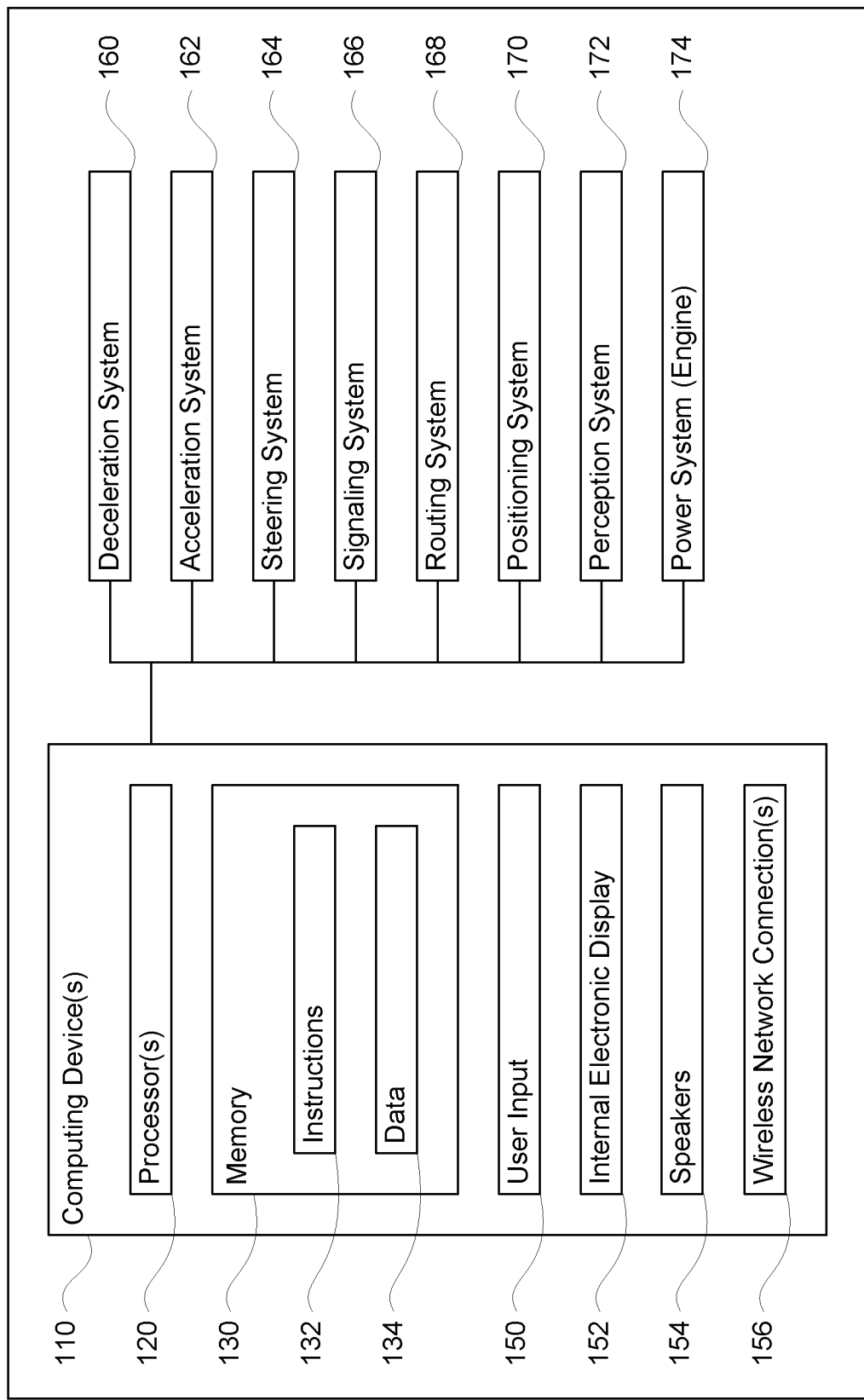
FIG. 1 is a functional diagram of an example vehicle in accordance with an exemplary embodiment.

The technology relates to validating autonomous control software for controlling a vehicle in an autonomous driving mode. One approach for validating or partially validating the autonomous control software, may involve evaluating whether the autonomous control software will control an autonomous vehicle as good as, if not better than, an idealized human driver would control a vehicle with the same braking, acceleration, and steering capabilities in different types of situations. To achieve this, the autonomous control software may be compared with a validation model of this idealized human driver based on results of simulations or scenarios. Because humans are generally unpredictable, the validation model may be generated by establishing a set of characteristics. These characteristics may relate to stimulus, perception reaction time, movement or "travel" time, and control performance. In other words, the validation model may include validation models for how an idealized human would notice, react, and ultimately respond (for instance, by braking, swerving, or taking some other action) to avoid impending collisions. In this regard, the validation model may actually be expected to perform as good as or better than a human driver in many circumstances.

The scenarios may be generated as a situation which tests the response to another object which is behaving improperly. In this regard, the scenarios are not merely vehicles just driving around, but situations in which the response of the vehicle is critical for safety of the vehicle and any other objects.

Different scenarios may be generated from real driving events which were observed by people or autonomous vehicles or from situations imagined by human operators. A critical feature for each scenario is the "handover time" or the time when the autonomous control software and the validation model are given control of the vehicle within the scenario. The handover time may be automatically selected for each scenario according to the circumstances of that scenario and thereafter confirmed or hand tuned by a human operator. Using a simpler validation model for handover time with human review reduces unnecessary complications and calculations and can provide more consistent results over larger datasets.

The autonomous control software and the validation model may then be run through the scenarios in order to evaluate performance. The autonomous control software may "pass" a scenario if there is no collision or if there is a collision, the likelihood of injuries is very low. When evaluating the validation model's performance, the validation model may run the same scenario under each of a plurality of different responses. If the validation model passes using any one of the plurality of different responses, the validation model may be considered to have passed that scenario. In addition, the requirements to pass a scenario may be different for the autonomous control software as compared to the validation model. For instance, the requirements may be more stringent for the autonomous control software than the validation model.

The results of the scenarios may then be compared to evaluate the performance of the autonomous control software as compared to the validation model. In one instance, the autonomous control software may need to meet certain requirements, such as passing at least as many scenarios as the validation model. If the autonomous control software is able to meet these requirements for all categories of scenarios, the autonomous control software may be considered validated with respect to the validation model or at least partially validated with respect to the validation model if other validation processes are also used. In other words, meeting the requirements may indicate that the autonomous control software is at least as good as the validation model for the scenarios on which the autonomous control software and validation model were run. In this regard, the autonomous control software may be considered sufficient for use in real driving situations rather than only in simulations. Alternatively, if the autonomous control software is unable to meet these requirements for a certain group of scenarios, the results can be evaluated in further details to determine how autonomous control software can be tweaked as needed.

The features described herein may provide for a safe and effective way of validating autonomous control software for autonomous vehicles. For instance, the autonomous control software can not only be tested in hundreds of thousands of scenarios without endangering the life and property of actual persons, but can also be compared to a benchmark to confirm that the autonomous control software is actually "safe". In addition, using these scenarios may greatly accelerate evaluation of the autonomous control software, since thousands of tests can be run in a matter of hours, rather than the many months it would take to create and run each scenario manually. Moreover, the scenarios provide high standards for safety in situations in which safety is not always guaranteed and provide a benchmark for evaluating the response of the autonomous control software, rather than just observing such responses and "guessing" at whether they are effective. Without such testing, the risks of injury to persons or property using un-validated autonomous control software may be too great.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160, acceleration system 162, steering system 164, signaling system 166, routing system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Routing system 168 may be used by computing devices 110 in order to determine and follow a route to a location. In this regard, the routing system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
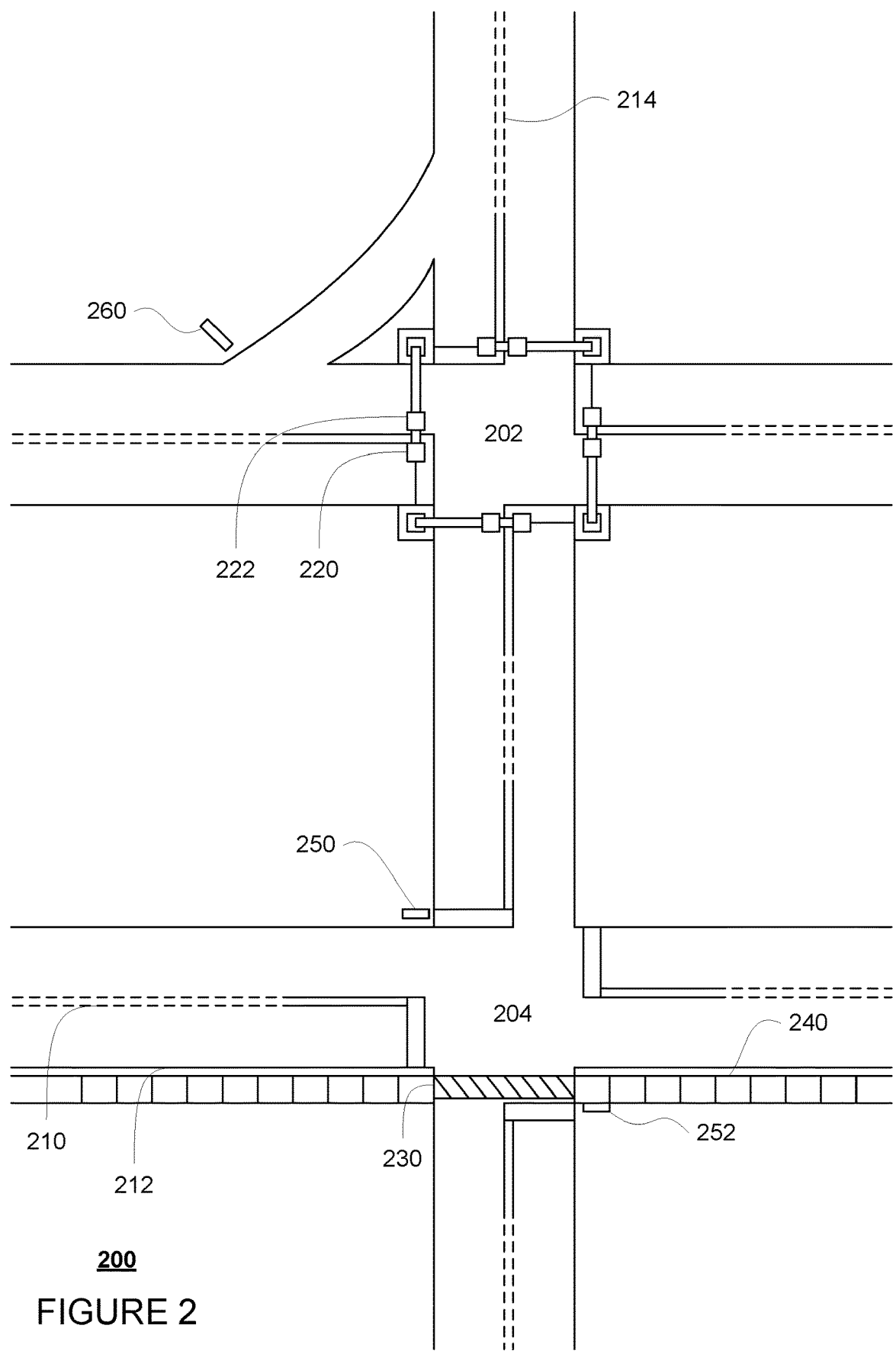
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
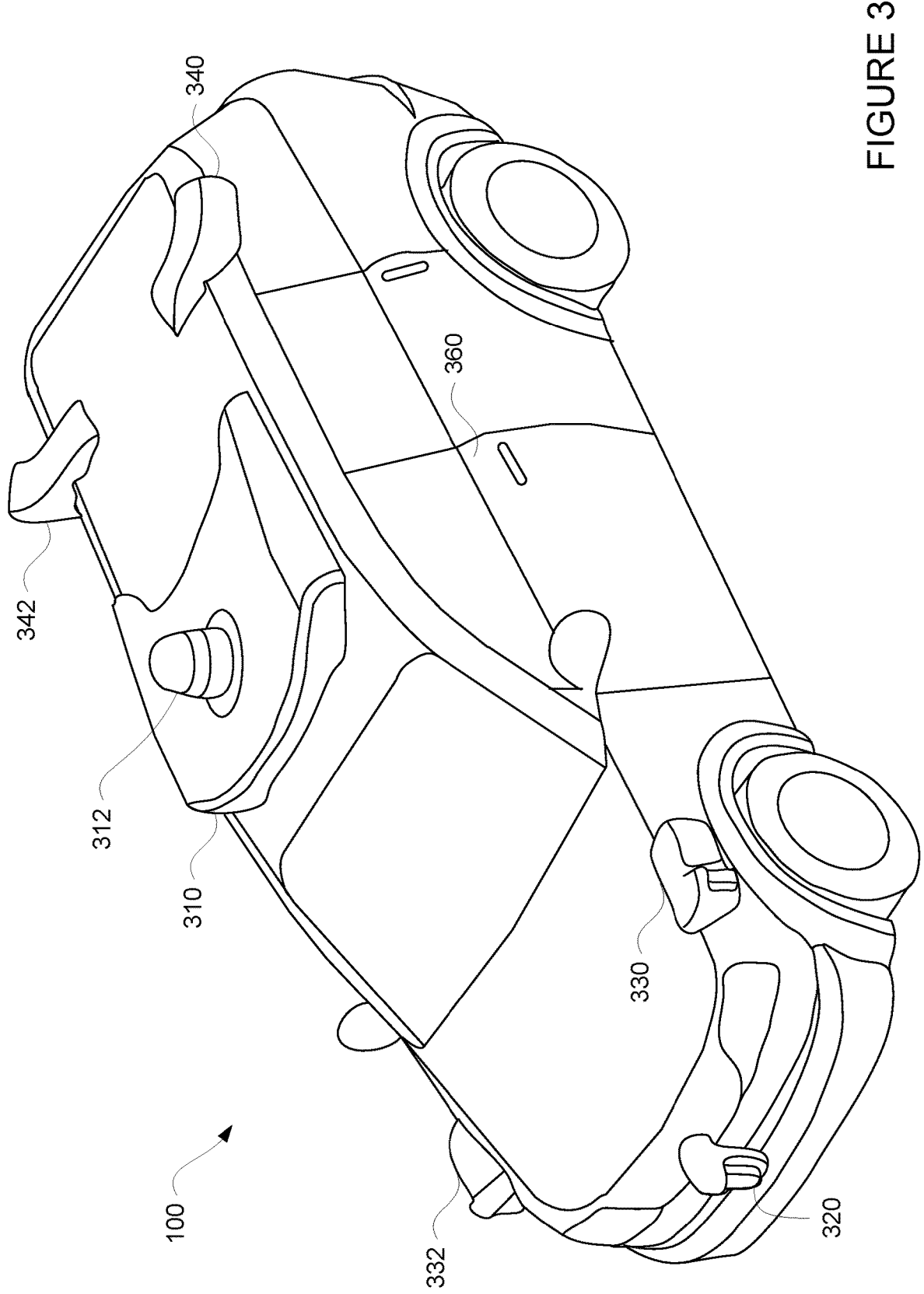
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and routing system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
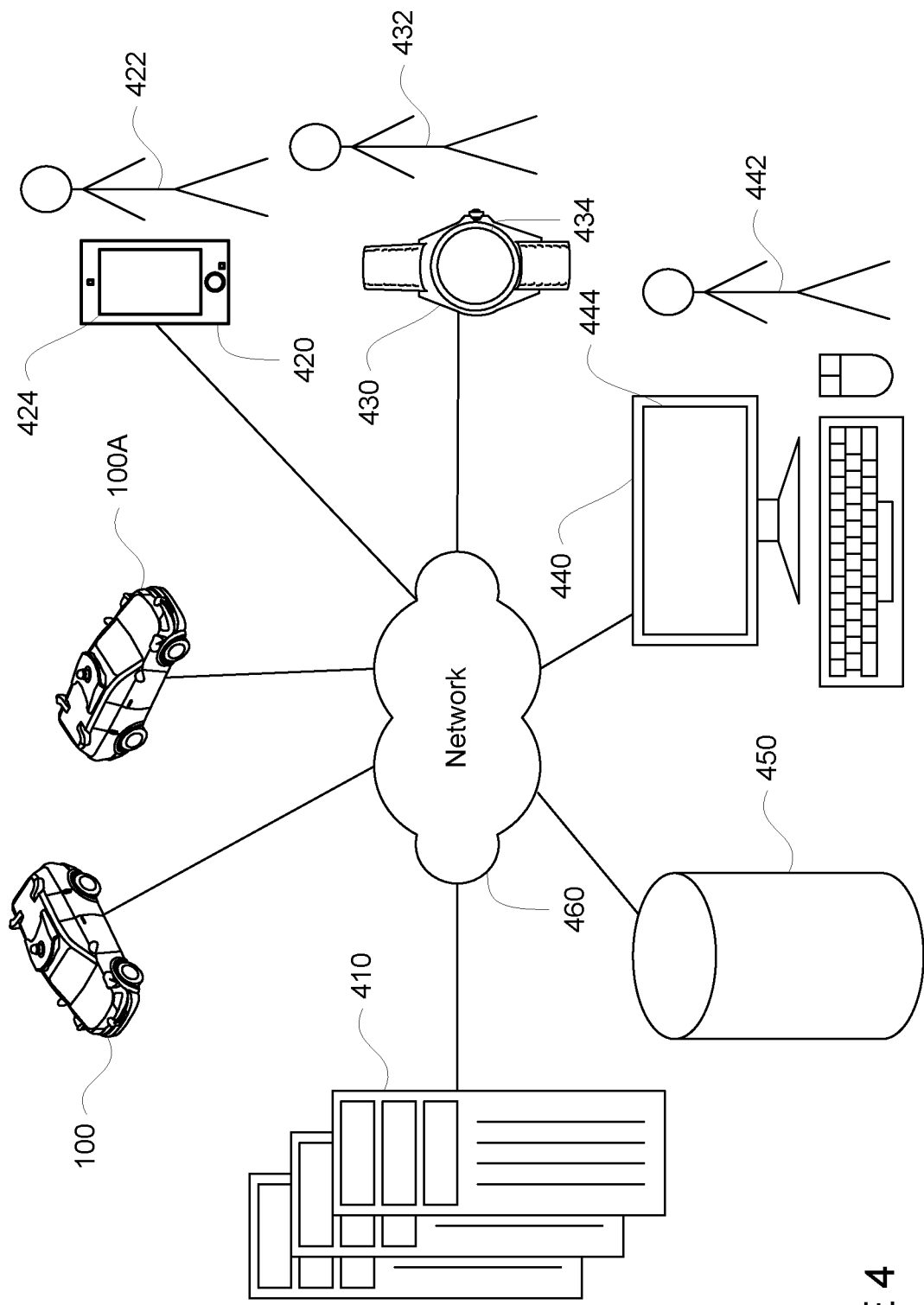
FIG. 4 is a pictorial diagram of an example system in accordance with aspects of the disclosure.
Figure 5:
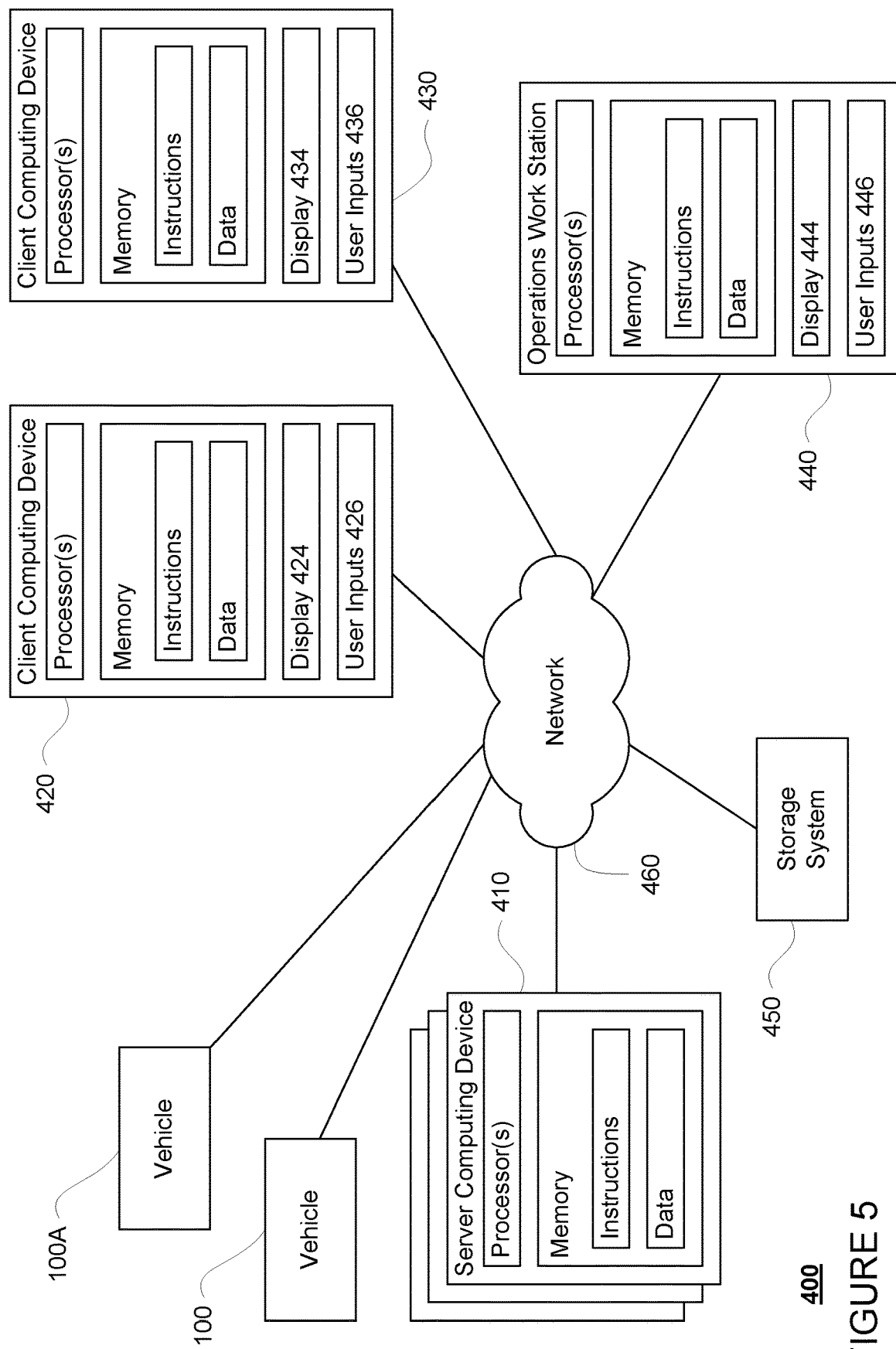
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store a validation model representing expected behaviors of an idealized human driver. The validation model may be generated by establishing a set of characteristics. These may relate to the response times, for instance for reacting to visual or audible stimuli by moving a foot or a hand to change braking, acceleration, and/or steering behaviors of a vehicle as with an idealized human driver. The validation model may also include a set of rules for determining how a virtual vehicle should behave. These rules may define behaviors such as path of a virtual vehicle, speed of a virtual vehicle, and how a virtual vehicle reacts to different objects. The set of characteristics and the set of rules may allow the validation model to control a virtual vehicle (i.e. brake, swerve, etc.) as if an ideal human were in control of the virtual vehicle. Such data is available from existing human response (or reaction) research or may be generated from running experiments to test actual human behavior. In this regard, the validation model may actually be expected to perform as good as or better than a human driver in many circumstances.

However, unlike a typical human driver, the validation model may be assumed to perceive more information within its environment than an autonomous vehicle, even objects which are occluded (for instance because they are in a vehicle's blind spot or behind another object). In other words, the perception of the validation model may even be "perfect" and even better than what would be expected of the autonomous vehicle. This may allow the validation model to be at least as capable as a nominal human while erring on the side of superhuman performance. For instance, for the validation model, driving behaviors, such as reaction times and swerving may be very human-like, whereas the perception may be almost "super-human". Alternatively, the perception for the validation model may be perfect only up to a certain distance, for instance 300 feet or more or less, and beyond that the validation model may have less than perfect or no perception. As a further alternative, the perception of the validation model may be limited to a particular field of view or such that the validation model's perception would not include blind spots or occluded areas for a typical human driver. Of course, these are merely examples, and features of the model, including the behaviors or perception may more closely model human performance or be super-human.

In addition to the validation model, the storage system 450 may also store a plurality of scenarios. The scenarios may be generated as a situation which tests the response to another object which is behaving improperly, for instance, speeding, running a stop sign or red light, driving erratically, etc. In this regard, the scenarios are not merely vehicles just driving around, but situations in which the response of the vehicle is critical for safety of the vehicle and any other objects. Each scenario may include information defining an environment for a virtual vehicle, such as road information defining characteristics such as shape, location, direction, etc. of a roadway. In addition, each scenario may also include object information defining characteristics of objects such as shape, location, orientation, speed, etc. of objects such as vehicles, pedestrians, bicyclists, vegetation, curbs, lane lines, sidewalks, crosswalks, buildings, etc. Further, each scenario may include characteristics for a virtual vehicle, corresponding to vehicle 100, including the virtual vehicle's shape, location, orientation, speed, etc. In addition, the environment and other objects for each scenario may include real world logged data (for instance, sensor data generated by a perception system, such as perception system 172 of vehicle 100), purely synthetic objects or sensor data created in simulation, or any combination of these.

Each scenario may also be associated with a "handover time" or the time when the autonomous control software and the validation model are given control of controlling the virtual vehicle within the scenario. The handover time may be automatically selected for each scenario according to the circumstances of that scenario. In some instances, the handover time may further be confirmed or hand tuned by a human operator, for instance using operations workstation 440. In one example, for a given scenario, if the autonomous vehicle would collide with another object, such as a vehicle, pedestrian, or bicyclist, in the scenario at some predetermined period of time into the future, such as 5 seconds or more or less, this may be selected as the handover time. This example assumes that both the autonomous vehicle and the other object would continue on their current paths (even if this is not the case in the actual scenario). This handover time may then be confirmed as reasonable or adjusted by a human operator. Using a simpler validation process for handover time with human review reduces unnecessary complications and calculations and can provide more consistent results over larger datasets.

Handover times may also be determined using different approaches. For instance, a handover time may correspond to a point in time when a human driver is unlikely to stop their behavior, such as a point in time when a human driver could no longer brake comfortably to avoid a collision. Alternatively, the handover time may correspond to a point in time when perception of a human driver would become less than perfect or less than some particular threshold. In yet another example, if a scenario results in an autonomous control software causing a collision for a virtual vehicle, the handover time for the validation model on the same situation may be several seconds earlier. Of course, any of these examples may also be confirmed as reasonable or adjusted by a human operator.

As a further example, the handover time may be determined based on the perception of the autonomous control software or the validation model. For instance, a validation model or autonomous control software with imperfect perception may not see or rather observe an object right away even if that object is behaving in such a way that it would require an emergency response. As such, the handover time may correspond to the point in time when the validation model or autonomous control software would or should actually observe that object. For example, if there is a pedestrian walking into the road from behind a parked vehicle, a validation model with perfect perception may start reacting to the person early, because the validation model or autonomous control software can observe that pedestrian walking even while he or she is behind the parked vehicle. However, a validation model or autonomous control software with imperfect perception may react later, because the validation model or autonomous control software cannot see or observe the pedestrian until he or she steps out from behind the parked vehicle. When a handover time is set by an operator manually, the operator can encode imperfect perception manually too, for example, by setting the handover time to when the person steps out from behind the parked vehicle.

Figure 6:
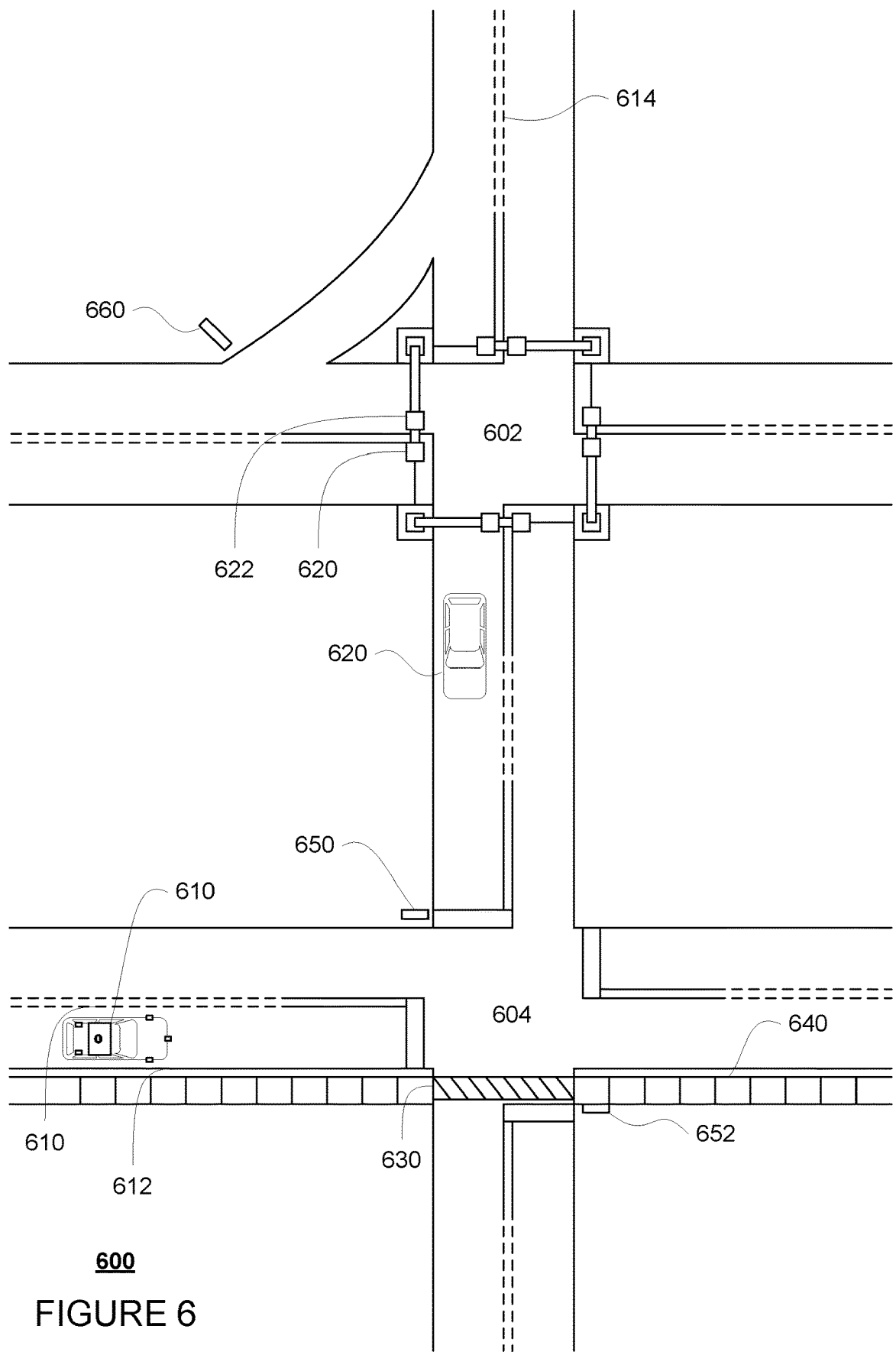
FIG. 6 is an example representation of a scenario in accordance with aspects of the disclosure.

FIG. 6 provides an example 600 of a scenario for a section of roadway corresponding to the map information 200. In this example, intersections 602 and 604 correspond to intersections 202 and 204, respectively. This regard, the shape, location, and other characteristics of lane lines 210, 612, 614, traffic signal lights 620, 622, crosswalk 630, sidewalks 640, stop signs 650, 652, and yield sign 660 corresponds to the shape, location and other characteristics of lane lines 210, 212, 214, traffic signal lights 220, 222, crosswalk 230, sidewalks 240, stop signs 250, 252, and yield sign 260.

In example 600, a virtual autonomous vehicle 610, corresponding to vehicle 100 or vehicle 100A, is approaching an intersection 604. A second virtual vehicle 620 is also approaching intersection 604. This scenario may include virtual vehicle 620 "behaving badly" because vehicle 620 may ignore stop sign 650. In this scenario, if virtual autonomous vehicle 610 and virtual vehicle 620 were to continue at their current speeds for the next 5 seconds (i.e. until the predetermined period of time into the future), the virtual vehicles would collide with one another. Thus, example 600 represents a scenario at a handover time.

The scenarios may be arranged in various ways. For instance, the scenarios grouped into or otherwise associated with categories, and these categories may be grouped together into larger category groupings. For instance, scenarios for right hand turns at stop signs at intersections may be one category. As another example, example 600 may be grouped into a category with other scenarios where a virtual vehicle is passing through an intersection without turning. Similarly, all categories relating to stop signs may be grouped together into a category grouping for stop sign scenarios. In addition, the scenarios within a given category or category group will each differ slightly. For instance, the speeds and positions of the virtual autonomous vehicle and other vehicles may be altered over different scenarios as well as the behaviors of the other vehicles. The shape of the turn or intersection may also be varied. Different scenarios may be generated from real driving events which were observed by people or autonomous vehicles or from situations imagined by human operators. By grouping scenarios into categories, it may be more readily apparent where issues with autonomous control software lie if the autonomous control software does not perform sufficiently well as discussed below.

In addition, the storage system 450 may also store autonomous control software which is to be used by vehicles, such as vehicle 100, to operate a vehicle in an autonomous driving mode. This autonomous control software stored in the storage system 450 may be a version which has not yet been validated. Once validated, the autonomous control software may be sent, for instance, to memory 130 of vehicle 100 in order to be used by computing devices 110 to control vehicle 100 in an autonomous driving mode.

EXAMPLE METHODS

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to validate the autonomous control software which will be stored in memory 130 for use by the computing devices 110 of vehicle 100, the validation models, scenarios, and handover times must each be built or determined. As noted above, the validation model may be generated by server computing devices, such as server computing devices 410, and/or one or more operational workstations, such as operational workstations 440, using a set of characteristics as discussed above. The scenarios may be generated using actual driving experiences of vehicles such as vehicle 100 or vehicle 100A and determining an appropriate handover time as discussed above. This information may be stored in storage system 450 as discussed above.

The server computing devices 410 may then access the storage system 450 in order to validate the autonomous control software stored in storage system 450. For instance, the server computing devices 410 may run each of the autonomous control software and the validation model through the scenarios of the storage system 450, category by category, category grouping by category grouping in order to evaluate performance. Using one category and/or category grouping at a time to validate the autonomous control software may provide opportunities to identify how the autonomous control software can be improved as opposed to running all scenarios in all categories at once. For instance, the autonomous control software and validation software may be run through the scenario of example 600 and any other scenarios within the same category or category grouping as example 600.

When running the autonomous control software through a given scenario, the details of the scenario may be used to generate a simulation. For instance, if needed, the environment and objects of a scenario may be converted to sensor data which a perception system, such as perception system 172, would be expected to provide to the computing devices 110 of vehicle 100 which would be operating in accordance with the autonomous control software. Alternatively, if the scenario already includes the sensor data, the scenario may simply be "played." In either case, the autonomous control software "experiences" or processes the scenario as if the autonomous control software was actually being run on vehicle 100. In other words, the autonomous control software is only provided with information which the perception system 172 would be able to detect about the scenario, and not every detail of the scenario. For instance, returning to example 600, the server computing devices 410 may run the scenario such that the autonomous control software is given access to the detailed map information 200 as well as any information that would be detected by a perception system of the virtual autonomous vehicle 610.

The autonomous control software may select only one response for each scenario to be followed by the virtual autonomous vehicle. Of course, the response determined by the autonomous control software will be determined according to the programming of that software. The actual characteristics of these responses may be dictated by any number of variables including, for instance, the capabilities (braking, acceleration, steering control, etc.) of the virtual vehicle as well as how the autonomous vehicle software carries out such responses. The simulation may thus provide an expected outcome for the scenario given the selected, or rather determined, type of response. This expected outcome may include information such as the final pose of the virtual autonomous vehicle, the final poses of any other vehicles or objects in the scenario, response times, whether there was a collision with any objects, etc.

The expected outcome may then be used to evaluate the autonomous control software's performance, or rather, to determine whether the autonomous control software "passed" or "failed" a given scenario. For instance, the autonomous control software may pass a scenario if there is no collision, if there is no collision and at least some minimum buffer distance (such as 2 feet or more or less) between the virtual vehicle and another object (with which there could have been a collision), if there is no collision and the vehicle did not need to make an unsafe maneuver to avoid a collision (such as by driving off of a roadway, speeding, driving towards oncoming traffic, using high longitudinal or lateral acceleration or jerk, or other dangerous maneuvers), if there is no collision and the reaction time to begin reacting to a potential collision in the scenario is not too slow (such as more than a fraction of a second, a second, a few seconds, or more or less depending on the scenario), if there is a collision but the likelihood of injuries is very low, or any other such considerations.

Analyzing the likelihood of injuries may involve identifying the attributes of a collision using the characteristics for the outcome of a given scenario, such as impact location, impact angle, and or speed of the virtual vehicle and the object with which it collided at the time of the collision in order to determine and quantify expected injury outcomes using known actuarial techniques and calculations for vehicle collisions. In this regard, an injury severity system such as the AIS classification of severity of injuries (issued by the Association for Advancement of Automotive Medicine) or the Classes of Severity defined in the ISO 26262 standard for Road Vehicle Functional Safety can be used to quantify expected injury outcomes in order to help identify "pass" or "fail" criteria. By way of example, using the definition of Classes of Severity from Table 2, collisions with severity level of S0 or S1 may be considered a "pass." All other collisions may be considered a "fail." Table 1 below provides an example representation of the Abbreviated Injury Score system, and Table 2 provides a mapping between the aforementioned ES levels and the AIS Score Codes of Table 1.

TABLE 1

| AIS Score Code | Injury | Example Type of Injury (not limiting) | AIS % Probability of Death |
|---|---|---|---|
| 1 | Minor | fractured sternum | 0 |
| 2 | Moderate | open fracture of humerus | 1-2 |
| 3 | Serious | perforated trachea | 8-10 |
| 4 | Severe | ruptured liver with tissue loss | 5-50 |
| 5 | Critical | total severance of aorta | 5-50 |
| 6 | Maximum |  | 100 |

TABLE 2

| Classes of Severity | Description |
|---|---|
| S3 | Life threatening injuries (survival uncertain), fatal injuries. More than 10% (or more or less) probability of AIS 5-6. |
| S2 | Severe and life-threatening injuries (survival probable). More than 10% (or more or less) probability of AIS 3-6 and not ES3. |
| S1 | Light and moderate injuries. More than 10% (or more or less) probability of AIS 1-6 and not ES2 or ES3. |
| S0 | Little or no injuries. Less than 10% (or more or less) probability of AIS 1-6. Damage that cannot be classified as safety related. |

In addition to running the autonomous control software through the scenarios, the validation model may also be run through the scenarios to determine whether the autonomous control software would pass the scenario. However, rather than limiting the validation model to the data that would be provided to computing devices 110 by the perception system 172, the validation model is provided with all of the information about the scenario. In this regard, the validation model has perfect perception as noted above, and thus is provided with more information than the autonomous control software about the scenario. Alternatively, the perception of the validation model may be limited as in any of the examples above.

Figure 7:
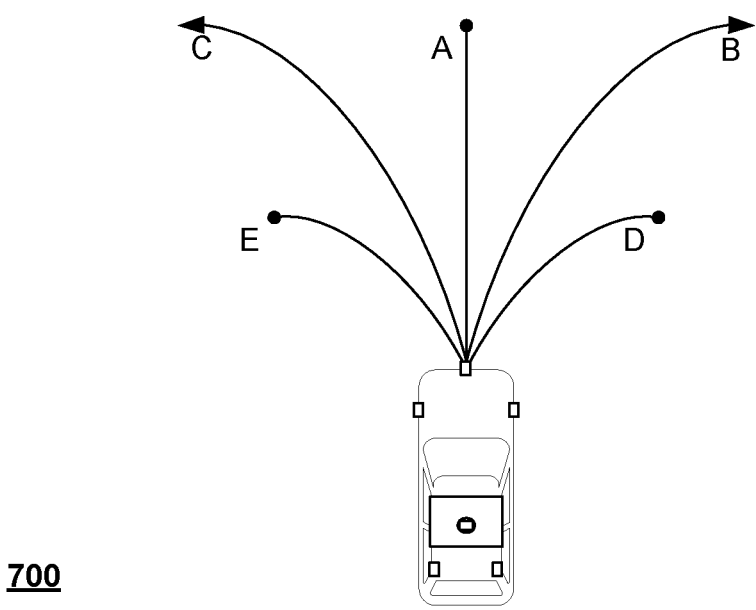
FIG. 7 is an example diagram of possible responses in accordance with aspects of the disclosure

In addition, when evaluating the validation model's performance, the validation model may run the same scenario under all or a subset of a predetermined set of general types of responses using the set of characteristics and the set of rules for the validation model. In other words, the validation model actually "takes the place" of the autonomous control software. As illustrated in example 700 of FIG. 7, these general categories of responses may include braking (represented by path A), swerving right (represented by path B), swerving left (represented by path C), braking and swerving right (represented by path D), or braking and swerving left (represented by path E). Other types of responses may also include other types of reactions, such as doing nothing (i.e. not changing acceleration/deceleration or direction), accelerating, or accelerating while swerving left or right, or swerving, braking or accelerating at different rates.

Again, the validation model would be run through the scenario using each of the different responses in the predetermined set or a predetermined sub-set of such responses for instance selected by a human operator for the particular scenario or category of scenario. In other words, the scenario of example 600, assuming the predetermined set includes general types of responses corresponding to possible paths A-E in examples 700, the scenario would be run once for each of the five possible paths. In this regard, the validation model would have the opportunity to try each of the types of responses in the predetermined set, including braking, swerving right, swerving left, braking and swerving right, or braking and swerving left in each scenario.

Again, the actual characteristics of these responses may be dictated by any number of variables including, for instance, the capabilities (braking, acceleration, steering control, etc.) of the virtual vehicle as well as how the validation model carries out such responses according to the set of characteristics and the set of rules for the validation model. The set of rules may be adjusted or specifically selected for certain scenarios, categories of scenarios, or all scenarios. For instance, the set of rules may define whether the model should ignore other objects in a scenario, try to avoid all objects in a scenario equally, or try to avoid some objects in a scenario (such as people, bicyclists, or other vehicles) more than other types of objects (such as curbs, medians, etc.). These set of rules may also define the speed of the virtual vehicle before responding to the scenario, such as for instance, whether the virtual model should maintain a constant speed, whether the model should maintain a specific speed (25 miles per hour or more or less), or whether the model should use the same speed plan as determined by the autonomous control software. The set of rules may also define whether the model should follow a specific geometry before responding to the scenario, whether the model should always follow the same geometry (for instance, always go straight), or whether the model should use the same geometry as determined by the autonomous control software.

In some cases, the specific characteristics of a type of response of the validation model as well as the acceleration (lateral and forward) of the virtual vehicle may also be defined by the set of rules. For instance, a specific ramping of braking could be encoded in the set of rules or in the scenario so that the validation model begins applying the brakes (decelerating) very hard at first, but once the virtual vehicle reaches a certain level of deceleration or speed, the validation model may apply the brakes at a slower rate.

Although the example predetermined set includes only 5 general types of responses, the set may include different or other types of responses, such as doing nothing (i.e. not changing acceleration/deceleration or direction), accelerating, or accelerating while swerving left or right. As another example, rather than using the entire or a subset of the predetermined set of responses, a human operator may encode the validation model with the "best" behavior, the validation model may run the scenario and predict what would be the best response for a given scenario according to the validation model, the validation model may always use the same response (for instance, always continue straight), or have the validation model follow the same path (i.e. the same geometry) determined by the autonomous vehicle software for the given scenario, but allow the validation model to determine how or whether to change the speed of the virtual vehicle.

Whether the validation model has passed or failed a scenario using a given one of the responses may be determined using the same or similar rules as for the autonomous control software. As an example, the validation model may pass a scenario based on, for example, any of the following: if there is no collision, if there is no collision and at least some minimum buffer distance between the virtual vehicle and another object, if there is no collision and the vehicle did not need to make an unsafe maneuver to avoid a collision, if there is no collision and the reaction time to begin reacting to a potential collision in a scenario is not too slow, as in the examples discussed above. If the validation model passes a scenario using any one of the different responses, the validation model may be considered to have passed that scenario. In this regard, the autonomous control software is tested one time for every five times the validation model is tested.

The results of the scenarios may then be compared to evaluate the performance of the autonomous control software as compared to the validation model. In one instance, the autonomous control software may need to meet certain requirements, such as passing at least as many scenarios as the validation model. In addition, to provide greater utility to the results of the comparison and a more useful analysis of the autonomous control software as compared to the validation model, the outcomes for a given categories or category grouping may be evaluated by aggregated or grouped together the evaluations of individual scenarios to determine how the autonomous control software performed as compared to the validation model for that given category or category grouping. For instance, in order to "pass" a category or category grouping, the outcomes for the autonomous control software may compared to the outcomes of the validation model.

As an example, to pass a given category, the autonomous control software may be required to achieve one or more of the following requirements: avoid collision in an equal or greater number of scenarios than the validation model within the given category, achieve an average buffer distance over all or a subset of the scenarios of the given category that is greater than or equal to an average buffer distance achieved by the validation model for those scenarios, achieve an average reaction time to begin reacting to a potential collision over all or a subset of the scenarios of the given category that is greater than or equal to an average reaction time to begin reacting to a potential collision achieved by the validation model for those scenarios, achieve average performance metrics (such as maximum lateral acceleration or deceleration, maximum longitudinal acceleration or deceleration. or jerk) over all or a subset of the scenarios of the given category that are less than or equal to average performance metrics achieved by the validation model, cause the virtual vehicle to perform maneuvers over all or a subset of the scenarios of the given category which are as safe or safer than maneuvers which the validation software cause the virtual vehicle to perform for those scenarios, and have no more collisions of a certain severity level or greater, such as S2 or S3, over all or a subset of the scenarios of the given category than the validation software for those scenarios. The "safety" of the maneuvers for the given category of scenarios may be evaluated by assigning a penalty or score value to each type of maneuver (e.g. stay within the lane, leaving the lane, leaving the roadway, etc.) performed by the virtual vehicle, and adding up the total score across a plurality of scenarios for both the autonomous control software and the validation model. In this example, the values of those total scores may be compared to determine the performance of the autonomous control software to the validation mode, or rather to determine if the autonomous control software's outcomes for the scenarios of a given category was as safe as or safer than the performance of the validation model for the scenarios of the given category. As noted above, this granularity within the categories and category groupings may provide a better understanding of where and how the autonomous control software can be improved.

Similarly, to pass a given category grouping, the autonomous control software may be required to achieve one or more of the aforementioned requirements for a given category, but rather than evaluating over the scenarios of a given category, the requirements may be evaluated over all scenarios within the categories or the category grouping. As part of this, the number of collisions, average buffer distances, average reaction times, average performance metrics, total scores for safety of maneuvers, numbers of collisions of a certain severity levels or greater, etc. for a plurality of categories within a category grouping may be added or averaged when evaluating those requirements for the category grouping in order to simplify this process. Again, as noted above, this granularity within the categories and category groupings may provide a better understanding of where and how the autonomous control software can be improved.

If the autonomous control software is able to meet the aforementioned requirements for all scenarios, categories and/or category groupings depending upon how the evaluations are conducted, the autonomous control software may be considered validated with respect to the validation model or at least partially validated with respect to the validation model if other validation processes are also used. In other words, meeting the requirements may indicate that the autonomous control software is at least as good as the validation model for the scenarios on which the autonomous control software and validation model were run. Alternatively, if the autonomous control software is unable to meet the aforementioned requirements for a certain category of scenarios, the results can be evaluated in further details to determine how autonomous control software can be tweaked as needed. The scenarios can be re-run and the autonomous control software evaluated as needed.

The validation model may be run through the scenarios only a single time, each time the validation model is updated, periodically, or every time that autonomous control software is run through the scenarios. By running the validation model through the scenarios every time that autonomous control software is run through the scenarios, this ensures that any recent changes to the validation model are considered when validating the autonomous vehicle control software.

Figure 8:
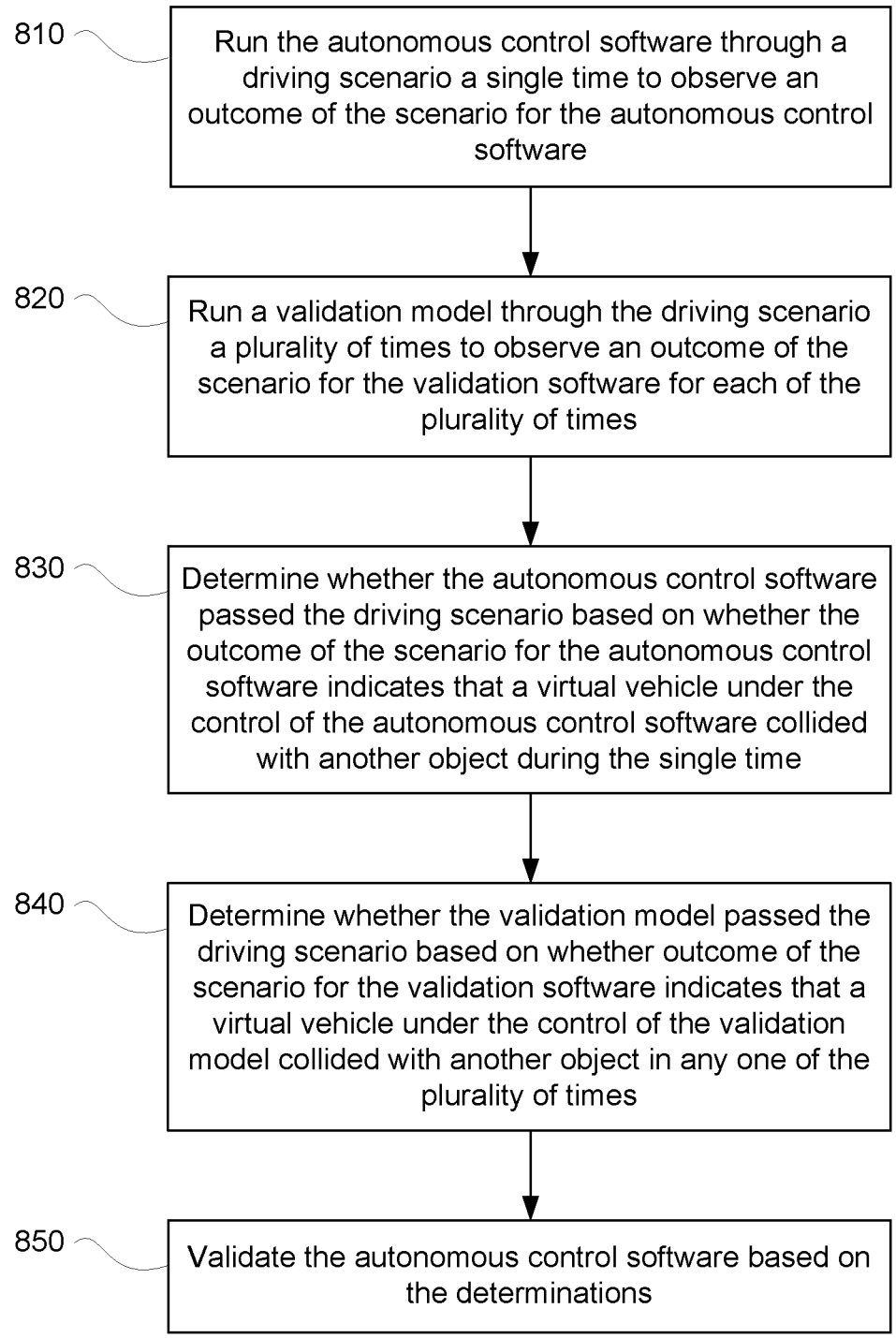
FIG. 8 is an example flow diagram in accordance with aspects of the disclosure.

FIG. 8 includes an example flow diagram 800 of some of the examples for validating autonomous control software, which may be performed by one or more processors such as processors of computing devices 410. For instance, at block 810, the autonomous control software is run through a driving scenario a single time to observe an outcome of the scenario for the autonomous control software. At block 820, a validation model is run through the driving scenario a plurality of times to observe an outcome of the scenario for the validation model for each of the plurality of times. At block 830, whether the autonomous control software passed the driving scenario is determined based on whether the outcome of the scenario for the autonomous control software indicates that a virtual vehicle under control of the autonomous control software collided with another object during the single time. At block 840, whether the validation model passed the driving scenario is determined based on whether outcome of the scenario for the validation model indicates that a virtual vehicle under control of the validation model collided with another object in any one of the plurality of times. At block 850, the autonomous control software is validated based on the determinations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of validating autonomous control software for operating a vehicle in an autonomous driving mode, the method comprising:

running the autonomous control software through a driving scenario a single time to observe an outcome of the scenario for the autonomous control software;

running a validation model that is different from the autonomous control software through the driving scenario once for each of a plurality of potential responses to the driving scenario to observe an outcome of the scenario for the validation model for each of the plurality of potential responses;

determining whether the autonomous control software passed the driving scenario based on whether the outcome of the scenario for the autonomous control software indicates that a virtual vehicle under control of the autonomous control software avoided a collision with a given object during the single time;

determining whether the validation model passed the driving scenario based on whether the outcome of the scenario for the validation model indicates that a virtual vehicle under control of the validation model avoided a collision with the given object in any one of the plurality of potential responses; and validating the autonomous control software based on a comparison of the determinations.

2. The method of claim 1, wherein determining whether the autonomous control software passed the driving scenario is further based on whether the virtual vehicle under control of the autonomous control software maintained at least a predetermined amount of buffer distance with the object during the single time.

3. The method of claim 1, wherein determining whether the validation model passed the driving scenario is further based on whether the virtual vehicle under control of the autonomous control software maintained at least a predetermined amount of buffer distance with the object in any one of the plurality of potential responses.

4. The method of claim 1, wherein determining whether the autonomous control software passed the driving scenario is further based on whether the virtual vehicle under control of the autonomous control software drove off a roadway to avoid a collision with the object during the single time.

5. The method of claim 1, wherein determining whether the validation model passed the driving scenario is further based on whether the virtual vehicle under control of the autonomous control software drove off a roadway to avoid a collision with the object in any one of the plurality of potential responses.

6. The method of claim 1, wherein determining whether the autonomous control software passed the driving scenario is further based on whether the virtual vehicle under control of the autonomous control software exceeded a speed limit to avoid a collision with the object during the single time.

7. The method of claim 1, wherein determining whether the validation model passed the driving scenario is further based on whether the virtual vehicle under control of the autonomous control software exceeded a speed limit to avoid a collision with the object in any one of the plurality of potential responses.

8. The method of claim 1, wherein determining whether the autonomous control software passed the driving scenario is further based on whether the virtual vehicle under control of the autonomous control software drove into an oncoming lane of traffic to avoid a collision with the object during the single time.

9. The method of claim 1, wherein determining whether the validation model passed the driving scenario is further based on whether the virtual vehicle under control of the autonomous control software drove into an oncoming lane of traffic to avoid a collision with the object in any one of the plurality of potential responses.

10. The method of claim 1, wherein determining whether the autonomous control software passed the driving scenario is further based on whether the virtual vehicle under control of the autonomous control software exceeded a predetermined amount of lateral or longitudinal acceleration to avoid a collision with the object during the single time.

11. The method of claim 1, wherein determining whether the validation model passed the driving scenario is further based on whether the virtual vehicle under control of the autonomous control software exceeded a predetermined amount of lateral or longitudinal acceleration to avoid a collision with the object in any one of the plurality of potential responses.

12. The method of claim 1, wherein running the autonomous control software through the driving scenario a single time includes:
determining, at a first point in time, that the virtual vehicle under control of the autonomous control software must change the speed or direction of virtual vehicle to avoid a collision with the object; and
causing, at a second point in time, the virtual vehicle under control of the autonomous control software to change its speed or direction to avoid a collision with the object; and
wherein determining whether the autonomous control software passed the driving scenario is further based on how much time elapsed between the first point in time and the second point in time.

13. The method of claim 1, wherein running the validation model through the driving scenario for a given potential response of the plurality of potential responses to the driving scenario includes:
determining, at a first point in time, that the virtual vehicle under control of the validation model must change the speed or direction of virtual vehicle to avoid a collision with the object; and
causing, at a second point in time, the virtual vehicle under control of the validation model to change its speed or direction to avoid a collision with the object; and
wherein determining whether the validation model passed the driving scenario is further based on how much time elapsed between the first point in time and the second point in time.

14. A system for validating autonomous control software for operating a vehicle in an autonomous driving mode, the system comprising one or more computing devices having one or more processors configured to:
run the autonomous control software through a driving scenario a single time to observe an outcome of the scenario for the autonomous control software;
run a validation model that is different from the autonomous control software through the driving scenario once for each of a plurality of potential responses to the driving scenario to observe an outcome of the scenario for the validation model for each of the plurality of potential responses;
determine whether the autonomous control software passed the driving scenario based on whether the outcome of the scenario for the autonomous control software indicates that a virtual vehicle under control of the autonomous control software avoided a collision with a given object during the single time;
determine whether the validation model passed the driving scenario based on whether the outcome of the scenario for the validation model indicates that a virtual vehicle under control of the validation model avoided a collision with the given object in any one of the plurality of potential responses; and
validate the autonomous control software based on a comparison of the determinations.

15. The system of claim 14, wherein the one or more processors are further configured to determine whether the autonomous control software passed the driving scenario based on whether the virtual vehicle under control of the autonomous control software maintained at least a predetermined amount of buffer distance with the object during the single time.

16. The system of claim 14, wherein the one or more processors are further configured to determine whether the validation model passed the driving scenario based on whether the virtual vehicle under control of the autonomous control software maintained at least a predetermined amount of buffer distance with the object in any one of the plurality of potential responses.

17. The system of claim 14, wherein the one or more processors are further configured to determine whether the autonomous control software passed the driving scenario based on whether the virtual vehicle under control of the autonomous control software drove off a roadway or into an oncoming lane of traffic to avoid a collision with the object during the single time.

18. The system of claim 14, wherein the one or more processors are further configured to determine whether the validation model passed the driving scenario based on whether the virtual vehicle under control of the autonomous control software drove off a roadway or into an oncoming lane of traffic to avoid a collision with the object in any one of the plurality of potential responses.

19. The system of claim 14, wherein the one or more processors are further configured to determine whether the autonomous control software passed the driving scenario based on whether the virtual vehicle under control of the autonomous control software exceeded a speed limit or a predetermined amount of lateral or longitudinal acceleration to avoid a collision with the object during the single time.

20. The system of claim 14, wherein the one or more processors are further configured to determine whether the validation model passed the driving scenario based on whether the virtual vehicle under control of the autonomous control software exceeded a speed limit or a predetermined amount of lateral or longitudinal acceleration to avoid a collision with the object in any one of the plurality of potential responses.

* * * * *

UNITED STATES PATENT AND TRADEMARK OFFICE
CERTIFICATE OF CORRECTION

PATENT NO. : 11,210,200 B2
APPLICATION NO. : 17/029663
DATED : December 28, 2021
INVENTOR(S) : Morley et al.

It is certified that error appears in the above-identified patent and that said Letters Patent is hereby corrected as shown below:

In the Claims

Claim 1, Column 18, Line 61:
Now reads: "with a given object during the single time"; should read -- with an object during the single time --

Claim 1, Column 18, Line 66:
Now reads: "a collision with the given object"; should read -- a collision with the object --

Claim 12, Column 20, Line 1:
Now reads: "change the speed or direction of virtual vehicle"; should read -- change a speed or direction of the virtual vehicle --

Claim 13, Column 20, Lines 16-17:
Now reads: "change the speed or direction of virtual vehicle"; should read -- change a speed or direction of the virtual vehicle --

Claim 14, Column 20, Line 45:
Now reads: "with a given object during the single time"; should read -- with an object during the single time --

Claim 14, Column 20, Line 50:
Now reads: "a collision with the given object"; should read -- a collision with the object --

Signed and Sealed this
Seventeenth Day of May, 2022

Katherine Kelly Vidal
*Director of the United States Patent and Trademark Office*